(12) United States Patent
Short et al.

(10) Patent No.: US 9,062,775 B2
(45) Date of Patent: Jun. 23, 2015

(54) SCOOPING HYDRODYNAMIC SEAL

(75) Inventors: John Francis Short, Smithfield, RI (US); Edward Nicholas Ruggeri, Westport, MA (US); Gerald Maurice Berard, North Providence, RI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/128,101

(22) PCT Filed: Jul. 2, 2012

(86) PCT No.: PCT/US2012/045280
§ 371 (c)(1),
(2), (4) Date: Jan. 16, 2014

(87) PCT Pub. No.: WO2013/006560
PCT Pub. Date: Jan. 10, 2013

(65) Prior Publication Data
US 2014/0117625 A1 May 1, 2014

Related U.S. Application Data

(60) Provisional application No. 61/503,815, filed on Jul. 1, 2011.

(51) Int. Cl.
*F16J 15/34* (2006.01)
(52) U.S. Cl.
CPC .......... *F16J 15/3448* (2013.01); *F16J 15/3412* (2013.01)
(58) Field of Classification Search
USPC .......................... 277/399–401, 403, 408, 409
See application file for complete search history.

(56) References Cited

U.S. PATENT DOCUMENTS

| | | | | |
|---|---|---|---|---|
| 3,782,737 | A | * | 1/1974 | Ludwig et al. ................. 277/400 |
| 3,804,424 | A | * | 4/1974 | Gardner ........................ 277/360 |
| 4,969,810 | A | | 11/1990 | Stolle et al. |
| 5,092,612 | A | * | 3/1992 | Victor et al. ................... 277/400 |
| 5,174,584 | A | * | 12/1992 | Lahrman ........................ 277/400 |
| 5,180,173 | A | * | 1/1993 | Kimura et al. ................. 277/400 |
| 5,222,743 | A | * | 6/1993 | Goldswain et al. ........... 277/400 |

(Continued)

FOREIGN PATENT DOCUMENTS

| | | |
|---|---|---|
| DE | 8814442 U1 | 3/1990 |
| WO | WO9506211 A1 | 3/1995 |

OTHER PUBLICATIONS

European Patent Office; Written Opinion and International Search Report issued in corresponding International Application No. PCT/US2012/045280. Date of Mailing: Oct. 22, 2012.

*Primary Examiner* — Kristina Fulton
*Assistant Examiner* — Eugene G Byrd
(74) *Attorney, Agent, or Firm* — Dykema Gossett PLLC

(57) ABSTRACT

A hydrodynamic face seal has a rotating first ring and a stationary second ring. The rotating first ring has an inner face. The stationary second ring has an inner face adjacent to the inner face of the rotating first ring. The inner face of the rotating first ring includes a groove having a fluid inlet portion and a hydrodynamic force generating portion. The fluid inlet portion of the groove has a depth greater than the hydrodynamic force generating portion of the groove. The fluid inlet portion has a minimum depth configured to create a higher pressure than a surrounding pressure around the rotating first ring, while not generating a hydrodynamic or hydrostatic force in the fluid inlet portion.

19 Claims, 4 Drawing Sheets

(56) References Cited

U.S. PATENT DOCUMENTS

| | | |
|---|---|---|
| 5,224,714 A | 7/1993 | Kimura et al. |
| 5,398,943 A | 3/1995 | Shimuzu et al. |
| 5,496,047 A | 3/1996 | Goldswain et al. |
| 5,605,339 A | 2/1997 | Pecht et al. |
| 5,702,110 A | 12/1997 | Sedy |
| 5,722,665 A | 3/1998 | Sedy |
| 6,142,478 A | 11/2000 | Pecht et al. |
| 6,189,896 B1 * | 2/2001 | Dickey et al. ............... 277/608 |
| 6,257,589 B1 * | 7/2001 | Flaherty et al. ............. 277/400 |
| 7,770,898 B2 | 8/2010 | Dietle et al. |
| 8,074,995 B2 | 12/2011 | Vasagar et al. |
| 8,162,322 B2 * | 4/2012 | Flaherty ...................... 277/400 |
| 8,757,632 B2 * | 6/2014 | Dobosz et al. .............. 277/399 |
| 2009/0279817 A1 | 11/2009 | Shimuzu et al. |

* cited by examiner

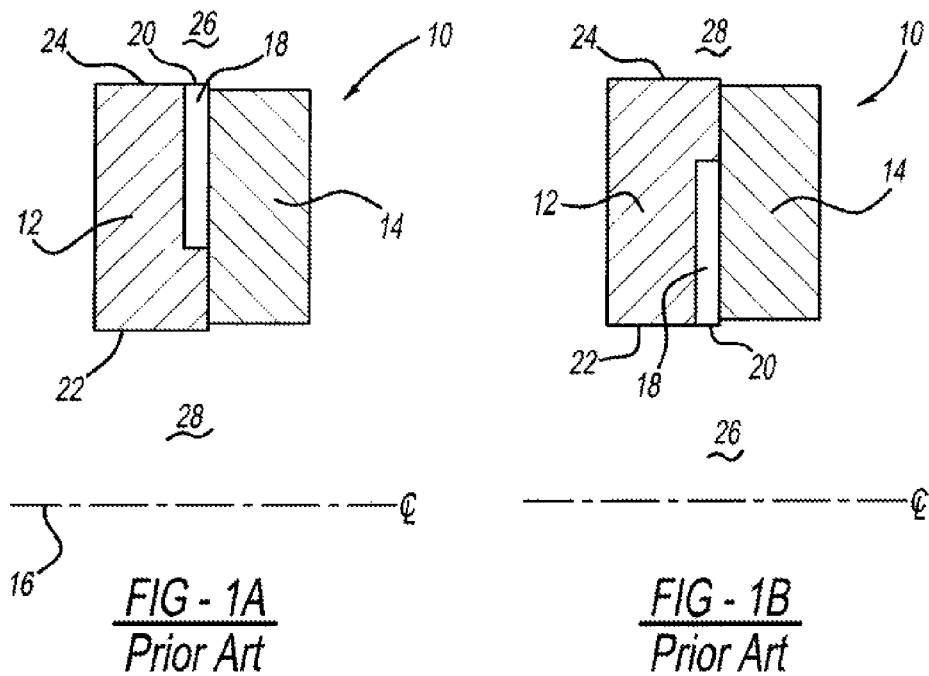
FIG - 1A
Prior Art
FIG - 1B
Prior Art
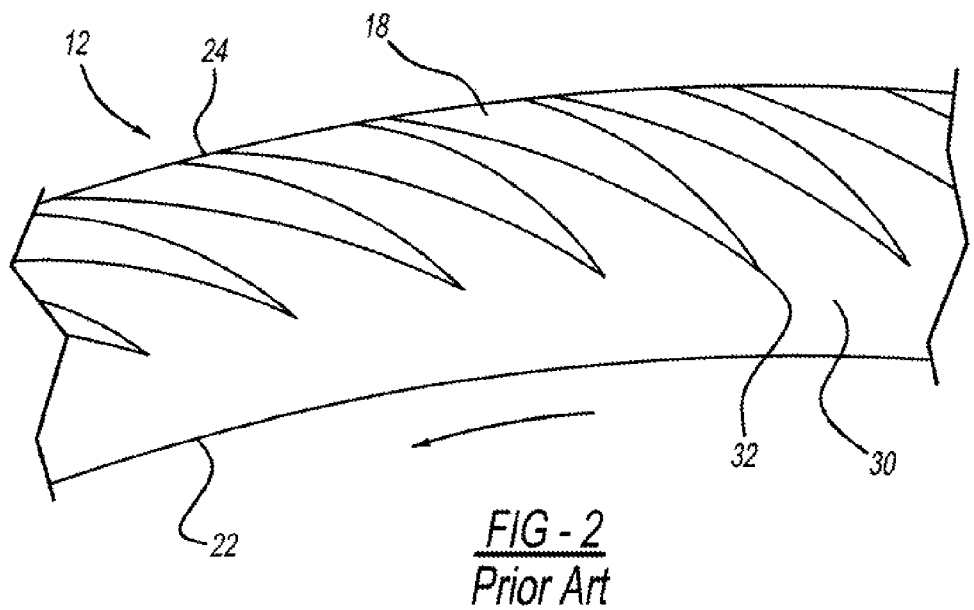
FIG - 2
Prior Art

SCOOPING HYDRODYNAMIC SEAL

CROSS-REFERENCE TO RELATED APPLICATION

This application is a national stage filing based upon International PCT Application No. PCT/U.S.2012/045280, with an international filing date of Jul. 2, 2012, which claims the benefit of the filing date of U.S. Provisional Patent Application Ser. No. 61/503,815, filed Jul. 1, 2011, the entire disclosure of which is incorporated herein by reference.

BACKGROUND

1. Technical Field

The present disclosure relates generally to hydrodynamic face seals.

2. Description Of The Related Art

Spiral groove lift-off seals (also known as hydrodynamic seals or hydrodynamic face seals) have been used successfully for many years in the industrial gas compressor industry. The physics of this type of seal is known and documented.

Generally, the seal assembly involves a high inlet fluid pressure (e.g., high gas density). The high fluid pressure may be located on either an outside diameter of a seal assembly or the inside diameter of a seal assembly, such as generally illustrated in the cross-sectional schematic seal assemblies of FIG. 1A and FIG. 1B, respectively. The seal assembly can be configured either way. The seal assemblies may comprise two rings where a face of each ring is adjacent to one another. A first ring may be a rotational member, also known as a mating ring or rotor, which may rotate about an axis that is generally shared by the two components. A second ring may be a stationary member, also known as a seal ring, and may be movable only in an axial direction. The first ring may contain a plurality of grooves on the face adjacent to the second ring as generally illustrated in FIGS. 1-3. The grooves, which may be spiral in shape, are grooved toward a low pressure side of the first ring. The grooves may have a dam section where the groove ends. A sealing effect around the dead ended grooves can provide a compression of a working fluid, such as gas, resulting in a pressure increase in the groove region. The increase in pressure can causes the faces to separate slightly, which can allow the pressured fluid, such as air, to escape the grooves. A steady state force balance between opening and closing forces is generally achieved at some determinable face separation gap. The seal may operate in a non-contact mode above some threshold rotational speed.

However, when employing conventional hydrodynamic groove technology for the purpose of producing a film riding seal (non-contacting) in sub-ambient atmosphere, such as the outside environment of an aircraft at cruising altitude, the ability for the working fluid to enter the shallow hydrodynamic grooves may be diminished due to the lower density and rarefication of the gas. As the actual volume of the working fluid, such as gas is reduced with the decreasing surrounding system pressure, the resulting hydrodynamic gas film between the rotating mating ring and the stationary seal ring can be significantly reduced. Thin hydrodynamic air films may not be entirely stable and may result in higher heat generation due, for example, to intermittent contact from transient conditions and high vicious shear of the fluid. With respect to aerospace applications, where high surface speed (e.g., 450 feet per second or faster) between the rotating mating ring and the stationary seal ring can be encountered, the aerodynamics of the fluid may further inhibit a working fluid from entering the hydrodynamic grooves.

Among other things, the present disclosure addresses one or more of the aforementioned challenges.

SUMMARY

A hydrodynamic face seal may comprise a rotational first ring and a stationary second ring. The rotating first ring may include an inner face. The stationary second ring may include an inner face adjacent to the inner face of the rotating first ring. The inner face of the rotating first ring may include a groove having a fluid inlet portion and a hydrodynamic force generating portion. The fluid inlet portion of the groove may have a depth greater than the hydrodynamic force generating portion of the groove. A minimum depth of the fluid inlet portion may be configured to create a higher pressure than a surrounding pressure around the rotating first ring, while not generating a hydrodynamic or hydrostatic force in the fluid inlet portion.

BRIEF DESCRIPTION OF THE DRAWINGS

The present invention will now be described, by way of example, with reference to the accompanying drawings, wherein like reference numerals identify like components in the several figures, in which:

FIGS. 1A and 1B are partial cross-sectional representations of a conventional hydrodynamic face seals.

FIG. 2 is a partial front view of the conventional hydrodynamic face seal represented in FIG. 1A.

DETAILED DESCRIPTION

Figure 3:
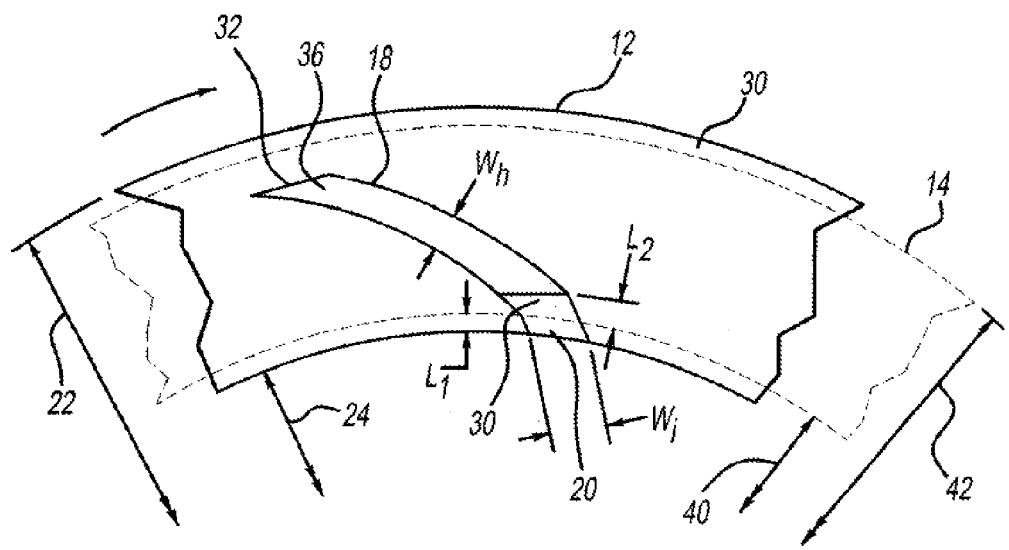
FIG. 3 is a partial front view of the conventional hydrodynamic face seal represented in FIG. 1B.

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Referring to FIGS. 1A, 1B, and 2, aspects of hydrodynamic face seals 10 are generally illustrated. As depicted in FIG. 1A, a hydrodynamic face seal 10 may comprise a first ring 12 and a second ring 14. The first ring 12, which may also be referred to as a mating ring or rotor, may rotate about a commonly shared center line 16 with respect to the first ring 12 and the second ring 14.

The first ring 12 may include a groove 18 or a plurality of grooves, where each groove 18 of the plurality of grooves may have characteristics such as those described in further detail herein. The groove 18 may have an opening 20 along a surface (e.g., circumferential surface) of the first ring 12, where the opening 20 is provided on an inner diameter 22 (e.g., as illustrated in FIG. 1B), or on an outer diameter 24 (e.g., as illustrated in FIG. 1A). Generally, the opening 20 of the groove 18 is provided on the high pressure side 26 of a face seal as opposed to the low pressure side 28 of the face seal. That is, if the high pressure side 26 is associated with the outer diameter 24 of the first ring 12, then the opening 20 may be provided on a circumferential surface of the outer diameter 24 of the first ring 12, such as generally illustrated in FIG. 1A. Alternatively, if the high pressure side 26 is associated with the inner diameter 22 of the first ring 12, then the opening 20 may be provided on the circumferential surface of the inner diameter 22 of the first ring 12, such as generally illustrated in FIG. 1B.

Figures 4A, 4B:
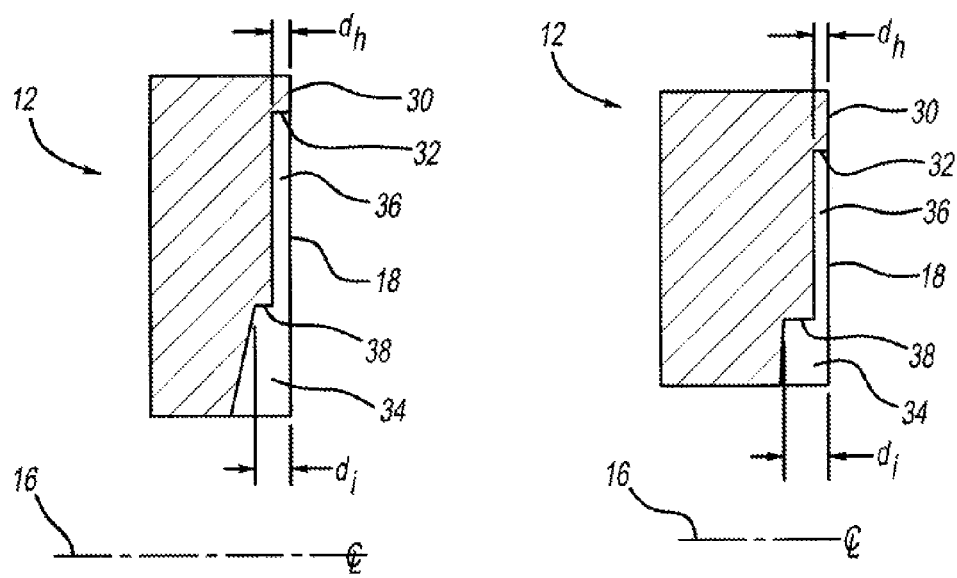
FIGS. 4A and 4B are cross-sectional views of hydrodynamic face seals according to embodiments of the present disclosure.

For some assemblies, the groove 18 may have a uniform depth along an inner face 30 of the first ring 12. The depth of the groove 18 may be configured to generate a hydrodynamic force. Groove 18 depths may vary, for example, from 150 to 900 micro-inches. The groove 18 may have a dam 32 (e.g. as generally shown in FIGS. 3, 4A, and 4B) where the groove 18 ends somewhere along the face of the first ring 12. The dam 32 can facilitate the compression of a fluid, such as a gas (e.g., air), which can result in a pressure increase in the groove 18 of the first ring 12. The increase in the pressure may cause the face of the first ring to separate slightly from a corresponding/mating surface of an adjacent component (e.g., second ring 14). This separation may be in the order of around 100 to 600 micro-inches. Seal leakage occurs across the dam 32 section may be relatively low because of the very small gap between the sealing faces.

The second ring 14, which may also be referred to as a seal ring, may be stationary in terms of rotation, but for applications may be permitted to move in the axial direction—e.g., along a center line 16. A face of the seal ring 14 adjacent the face of the mating ring 12 may be a flat lapped face, and may therefore be substantially flat. With embodiments, the grooves 18 may be placed on the second ring 14 as opposed to the first ring 12, although such a configuration may be less common in connection spiral groove configurations. With embodiments, the rotating first ring 12 having the grooves 18 is most often constructed of a hard face coating or material with respect to the stationary second ring 14.

Figure 5:
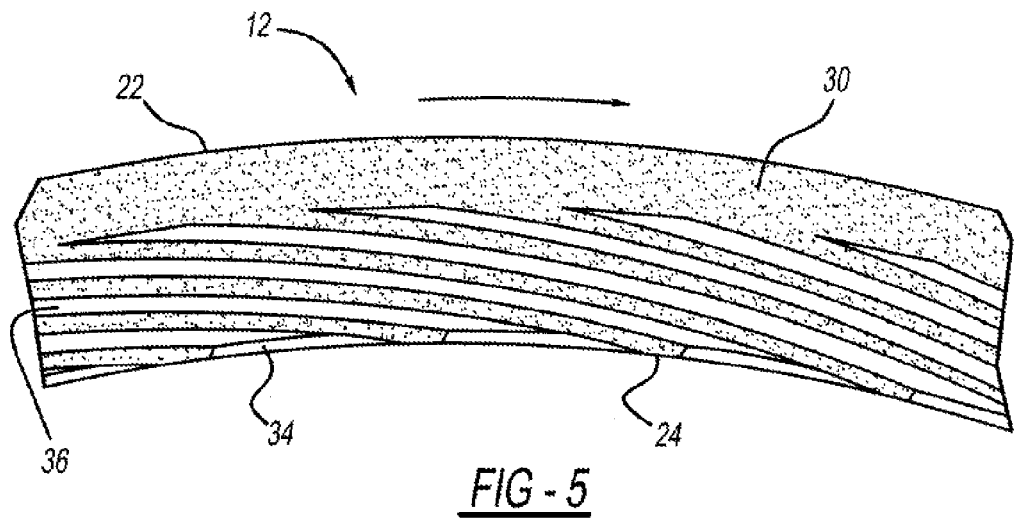
FIG. 5 is a partial front view of a hydrodynamic face seal according to an embodiment of the present disclosure.
Figure 6:
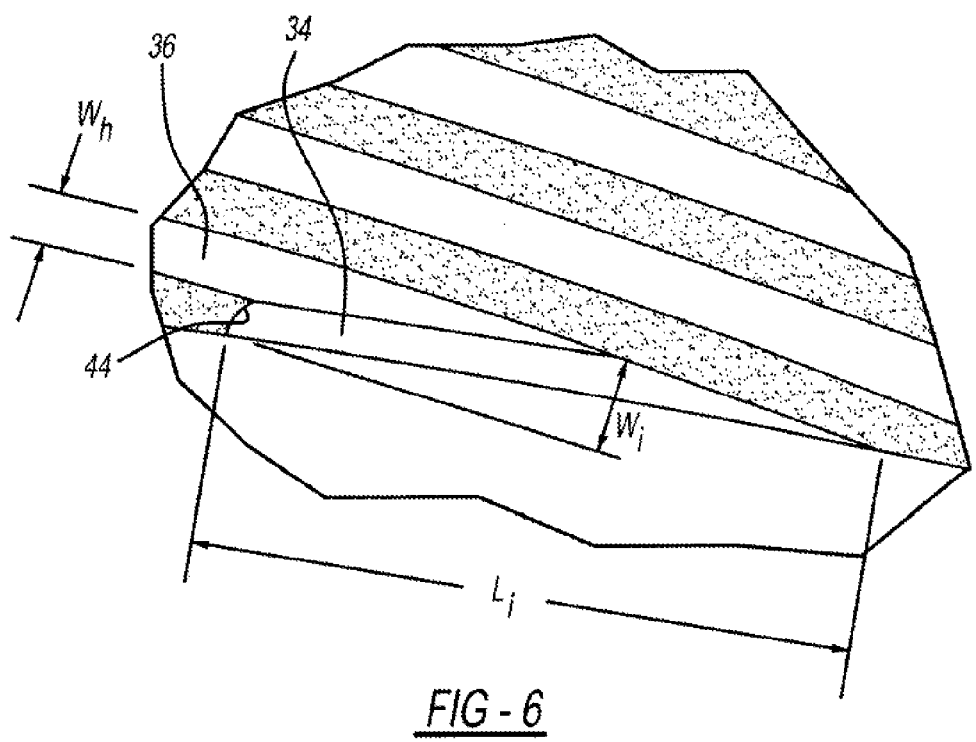
FIG. 6 is an enlarged detail view of a scooping groove according to an embodiment of the present disclosure that generally illustrates a "chopper area" configured to create disruption within the film boundary layer and permit the redirection of a working fluid.

With embodiments, to improve the volume of the fluid (e.g., gas) entering the groove 18, such to create a film riding seal in a sub-ambient atmosphere, an inlet in connection with embodiments of this disclosure, such as described and illustrated below, may be provided. With reference to FIGS. 4-6, embodiments of a groove 18 that includes a fluid inlet portion 34 and a hydrodynamic force generating portion 36 are generally illustrated.

In an embodiment, a fluid inlet portion may be configured such that opening 20 of the groove 18 is provided on the circumferential surface of inner diameter 22 or the outer diameter 24 of the first ring 12. However, the opening 20 of the groove 18 via the fluid inlet portion 34 may also be exposed on the inner face surface 30 of the first ring 12 by extending at least a portion of the fluid inlet portion 34 in a radial direction beyond at least one of the inner diameter 40 of the second ring 14 or the outer diameter 42 of the second ring 14, as the case may be. With such a configuration, either the inner diameter 40 of the second ring 14 is larger than the inner diameter 24 of the first ring 12 (i.e., exposing a portion of the inner face 30 of the first ring to the high pressure side 26), or the outer diameter 42 of the second ring 14 is smaller than the outer diameter 22 of the first ring 12 (i.e., exposing a portion of the inner face 30 of the first ring to the high pressure side 26). For example, in an embodiment, a portion of the fluid inlet portion 34 may extend by at least a length ($L_1$) of 0.01 inches in a radial direction beyond at least one of the inner diameter 40 of the second ring 14 or the outer diameter 42 of the second ring 14.

In addition to the portion of the fluid inlet portion 34 being exposed to the high pressure side 26 acting as an opening 20, another portion of the fluid inlet portion 34 may not be exposed to the high pressure side 26, but rather, may be covered by the second ring 14. For example, in an embodiment, a portion of the fluid inlet portion 34 may extend by at least a length ($L_2$) of 0.01 inches in an inward radial direction beyond at least one of the inner diameter 40 of the second ring 14 or the outer diameter 42 of the second ring 14, depending upon the (OD/ID) configuration employed.

As generally illustrated in FIGS. 4A and 4B, a hydrodynamic force generating portion 36 may be relatively shallow in depth compared to the fluid inlet portion 34, both relative to the inner face 30 of the rotating first ring 12. The hydrodynamic force generating portion 36 can be configured to develop a hydrodynamic force to create lift-off during operation. When the first ring 12 is rotated at a particular speed, fluid enters the shallow hydrodynamic force generating portion 36 and the fluid is accelerated by the inertia of the first ring 12 toward the dam 32. The accelerated fluid may increase the pressure between the first ring and the second ring, and may produce a hydrodynamic air film. In an embodiment, the hydrodynamic force generating portion 36 depth may have a substantially consistent or constant depth, and the depth may be configured for an intended or anticipated rotational speed associated with the first ring 12. For example and without limitation, in various embodiments, the depth of the hydrodynamic force generating portion 36 may range from about 150 micro-inches to 900 micro-inches. If the depth of the hydrodynamic force generating portion 36 is too great or too small, the hydrodynamic force may not be created or may not be sufficiently strong to provide the necessary separation between the faces of the rotating first ring 12 and stationary second ring 14.

The fluid inlet portion 34 may be deeper than the hydrodynamic force generating portion 36 of the groove 18. With embodiments, the depth ($d_i$) of the fluid inlet portion 34 may be sufficiently deep that it will not develop hydrodynamic or hydrostatic force (e.g., lift-off force) in that region. For example, in various embodiments, the depth ($d_i$) of the fluid inlet portion 34 may be between about three times and about ten times deeper than the depth ($d_h$) of the hydrodynamic force generating portion 36. In an embodiment, the depth ($d_i$) of the fluid inlet portion 34 may be substantially constant and may transition into the hydrodynamic force generation portion 36 via a step 38, for example, as generally illustrated in FIG. 4B. In another embodiment, the depth ($d_i$) of the fluid inlet portion 34 may be sloped, wherein the minimum depth ($d_{i\text{-}min}$) of the fluid inlet portion 34 is closer to the transition step 38 from the fluid inlet portion 34 to the hydrodynamic force generating portion 36, for example, as generally illustrated in FIG. 4A. With such an embodiment, the minimum depth ($d_{i\text{-}min}$) of the fluid inlet portion 34 may be between about three times and about ten times deeper than the depth ($d_h$) of the hydrodynamic force generating portion 36. In various embodiments, the minimum depth ($d_{i\text{-}min}$) of the fluid inlet portion 34 may be between about 0.002 inches and about 0.025 inches.

In an embodiment, the width ($W_i$) of the fluid inlet portion 34 may be substantially the same as the width ($W_h$) as the force generating portion 36, for example, as generally illustrated in FIG. 3. In another embodiment, the width ($W_i$) of the fluid inlet portion 34 may be greater than the width ($W_h$) of the force generating portion 36, such as generally illustrated in connection with FIGS. 5 and 6. The wider width ($W_t$) of the fluid inlet portion 34 can increase the length ($L_t$) of the fluid inlet portion 34. In embodiments, for example as generally illustrated in FIGS. 5 and 6, the wider width of the fluid inlet portion 34 relative to the force generating portion 36 can create a "chopper area" that may increase the amount or volume of surrounding fluid that is collected by the fluid inlet portion 34. Such a "chopper area" may have a scooping radius (e.g., scooping radius 44) that is provided near an end of the fluid inlet portion 34 and, for some embodiments, a transition step 38 may be configured to create disruptions in the surround fluid boundary layer.

With embodiments, the fluid inlet portion 34 may be configured to serve as inlet plenum for the hydrodynamic force generating portion 36. Rather than creating hydrodynamic or hydrostatic forces, the comparatively deeper fluid inlet portion 34 can be configured to cause a disruption of the fluid boundary layer and may create eddy currents within the fluid inlet portion 34. This disruption caused by the fluid inlet portion 34 may enhance the capture and redirection of fluid in the high pressure side 26 to the hydrodynamic force generating portion 36 of the groove 18. That is, for embodiments, a disruption caused by the fluid inlet portion 34 can "supercharge" a comparatively relatively shallow hydrodynamic force generating portion 36 of the groove 18 to create a pressure significantly higher than that of the system and/or ambient pressure. As such, kinetic energy associated with the fluid inlet portion 34 of the first ring 12 may be transformed into potential energy in the form of compressed fluid pressure within the hydrodynamic force generation portion 34. This effect may be especially beneficial in aerospace applications where sub-ambient atmosphere conditions may occur. Utilizing some of the foregoing features may entrap more fluid and result in a more robust, thicker and stiffer fluid film between the first ring 12 and the second ring 14.

Figure 7:
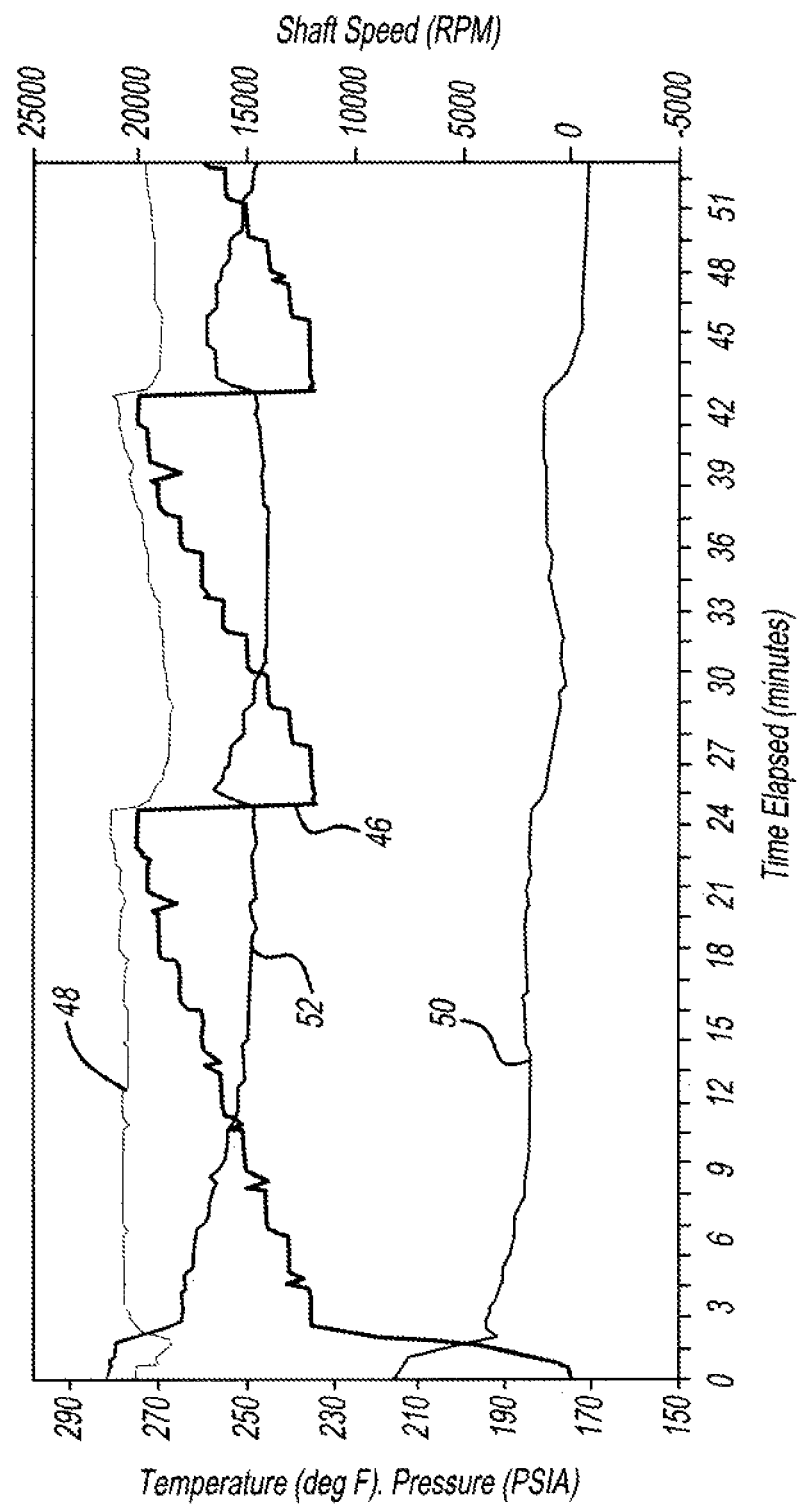
FIG. 7 is a graph generally illustrating seal face temperature invariance with changing shaft speeds.

An embodiment of the present disclosure was tested in a simulated working environment. Results associated with the testing are included in the graph shown in FIG. 7. The graph generally illustrates an anticipated seal face temperature invariance with changing shaft speeds with reference to the time elapsed. Various temperatures were measured, including the seal face temperature along plot line 48, the source air temperature along plot line 50, and the air/oil temperature along plot line 52. The shaft speed (measured in RPM) is also shown along plot line 46 illustrated in shaft speed versus the time elapsed and overlayed upon the temperature versus time elapsed for correlation of the temperature and shaft speed with relation to the time elapsed. As generally shown in FIG. 7, the seal face temperature as illustrated by plot line 48 remains fairly constant with any variation coinciding with the changes to the shaft speed as shown with plot line 46. This may be indicative of a sufficient film being provided between the seal rings. In a similar test using a conventional groove design, the seal face temperature increased more significantly for a given shaft speed, which may be indicative of comparatively less film being provided between the seal rings.

It is noted that the drawings are intended to illustrate various concepts associated with the disclosure and are not intended to so narrowly limit the invention. A wide range of changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed:

1. A hydrodynamic face seal comprising:
a rotating first ring having an inner face;
a stationary second ring having an inner face adjacent to the inner face of the rotating first ring; and
wherein the inner face of the rotating first ring includes a groove having a fluid inlet portion and a hydrodynamic force generating portion, the fluid inlet portion of the groove has a depth greater than the hydrodynamic force generating portion of the groove, and the fluid inlet portion has a minimum depth configured to create a higher pressure than a surrounding pressure around the rotating first ring, while not generating a hydrodynamic or hydrostatic force in the fluid inlet portion; and
wherein a depth of the fluid inlet portion of the groove is between about 0.051 millimeters (0.002 inches) and about 0.635 millimeters (0.025 inches).

2. The hydrodynamic face seal of claim 1, wherein the fluid inlet portion of the groove is located on an outer diameter of the rotating first ring.

3. The hydrodynamic face seal of claim 1, wherein the fluid inlet portion of the groove is located on an inner diameter of the rotating first ring.

4. The hydrodynamic face seal of claim 1, wherein the fluid inlet portion of the groove is wider than the hydrodynamic force generating portion and the additional width of the fluid inlet portion forms a scooping radius located proximate an end of the fluid inlet portion and a transition step area between the fluid inlet portion and the hydrodynamic force generating portion, wherein the scooping radius is configured to generate a disturbance in the surrounding boundary layer of a fluid.

5. The hydrodynamic face seal of claim 1, wherein the entire hydrodynamic portion of the groove is located between the rotating first ring and the stationary second ring.

6. The hydrodynamic face seal of claim 1, wherein the minimum depth of the fluid inlet portion is at least three times deeper than a depth of the hydrodynamic force generation portion of the groove.

7. The hydrodynamic face seal of claim 1, wherein the minimum depth of the fluid inlet portion is between three times and ten times deeper than a depth of the hydrodynamic force generation portion of the groove.

8. The hydrodynamic face seal of claim 1, wherein the fluid inlet portion is tapered such that the depth of the fluid inlet portion decreases toward the hydrodynamic force generation portion of the groove.

9. The hydrodynamic face seal of claim 1, wherein the depth of the fluid inlet portion is substantially constant.

10. The hydrodynamic face seal of claim 1, wherein a width of the fluid inlet portion of the groove is larger than a width of the hydrodynamic force generation portion of the groove.

11. The hydrodynamic face seal of claim 1, wherein the hydrodynamic force generation portion of the groove is spiral shaped.

12. A hydrodynamic face seal comprising:
a rotating first ring having an inner diameter and an outer diameter;
a stationary second ring having an inner diameter and an outer diameter; and
wherein the first ring includes a groove having a fluid inlet portion and a hydrodynamic force generating portion located on a face of the first ring, the fluid inlet portion of the groove is configured to create a higher pressure than a surrounding pressure around the rotating first ring while not generating a hydrodynamic or hydrostatic force in the fluid inlet portion, at least one of the inner diameter of the stationary second ring is larger than the inner diameter of the rotating first ring or the outer diameter of the stationary second ring is smaller than the outer diameter of the rotating ring, and at least a portion of the fluid inlet portion of the groove extends radially beyond at least one of the inner diameter of the stationary second ring or the outer diameter of the stationary second ring; and wherein a depth of the fluid inlet portion of the groove is between about 0.051 millimeters (0.002 inches) and about 0.635 millimeters (0.025 inches).

13. The hydrodynamic face seal of claim 12, wherein the portion of the fluid inlet portion of the groove extending radially beyond at least one of the inner diameter of the stationary second ring or the outer diameter of the stationary second ring is at least about 0.25 millimeters (0.01 inches).

14. The hydrodynamic face seal of claim 12, wherein another portion of the fluid inlet portion of the groove extends radially inward of at least one of the inner diameter of the stationary second ring or the outer diameter of the stationary second ring.

15. The hydrodynamic face seal of claim 14, wherein the another portion of the fluid inlet portion of the groove extending inward of at least one of the inner diameter of the stationary second ring or the outer diameter of the stationary second ring is at least about 0.25 millimeters (0.01 inches).

16. A hydrodynamic face seal comprising:
a rotating first ring having an inner face, an inner diameter and an outer diameter;
a stationary second ring having an inner face adjacent to the inner face of the rotating first ring, an inner diameter and an outer diameter; and
wherein the inner face of the first ring includes a groove having a fluid inlet portion and a hydrodynamic force generating portion located on a face of the first ring, the fluid inlet portion of the groove is configured to create a higher pressure than a surrounding pressure around the rotating first ring, while not generating a hydrodynamic or hydrostatic force in the fluid inlet portion;

wherein the fluid inlet portion of the groove has a depth greater than the hydrodynamic force generating portion of the groove, and a minimum depth of the fluid inlet portion is configured to create a higher pressure than a surrounding pressure around the rotating first ring while not generating a hydrodynamic or hydrostatic force in the fluid inlet portion;

wherein at least one of the inner diameter of the stationary second ring is larger than the inner diameter of the rotating first ring or the outer diameter of the stationary second ring is smaller than the outer diameter of the rotating ring, and at least a portion of the fluid inlet portion of the groove extends radially beyond at least one of the inner diameter of the stationary second ring or the outer diameter of the stationary second ring; and wherein a depth of the fluid inlet portion of the groove is between about 0.051 millimeters (0.002 inches) and about 0.635 millimeters (0.025 inches).

17. The hydrodynamic face seal of claim 16, wherein the minimum depth of the fluid inlet portion is between three times to ten times a depth of the hydrodynamic force generation portion of the groove.

18. The hydrodynamic face seal of claim 16, wherein the portion of the fluid inlet portion of the groove extending radially beyond at least one of the inner diameter of the stationary second ring or the outer diameter of the stationary second ring is at least about 0.25 millimeters (0.01 inches).

19. The hydrodynamic face seal of claim 16, wherein the rotational speed of the rotating first ring is about 20,000 RPM.

* * * * *